C. B. COOPER.
Water-Filter.
No. 163,362.
Patented May 18, 1875.
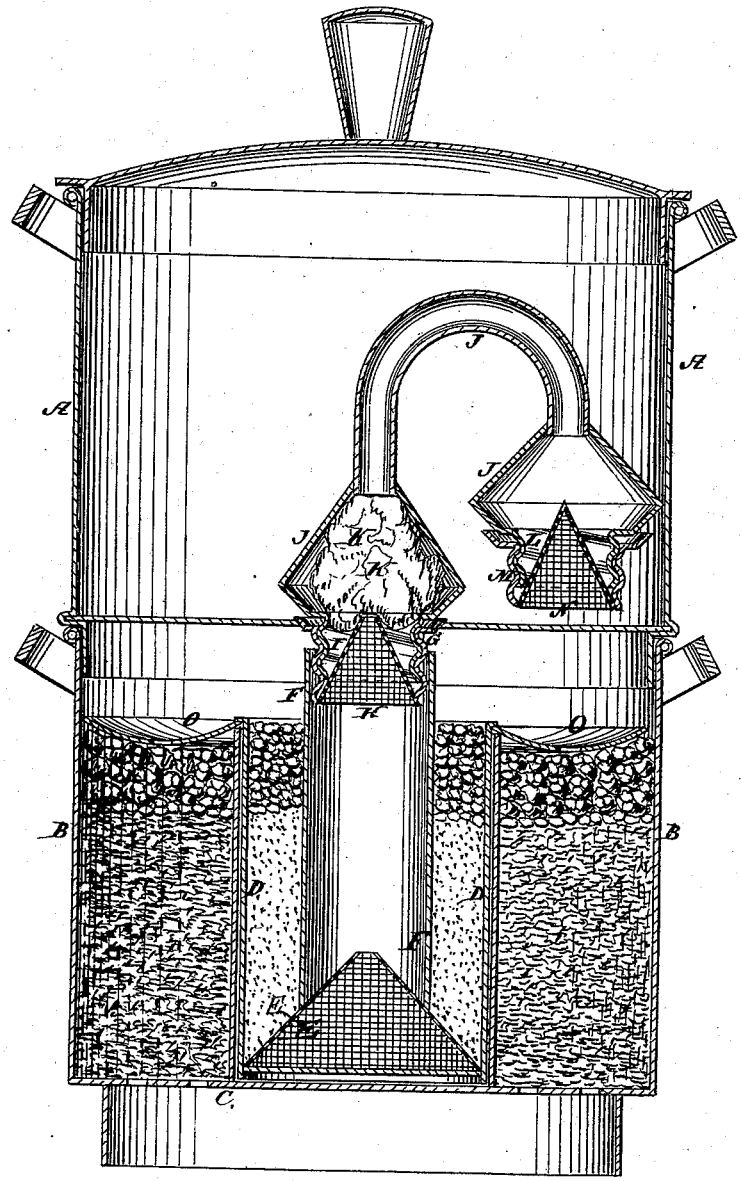

UNITED STATES PATENT OFFICE.

CHARLES B. COOPER, OF NASHVILLE, TENNESSEE.

IMPROVEMENT IN WATER-FILTERS.

Specification forming part of Letters Patent No. 163,362, dated May 18, 1875; application filed April 10, 1875.

*To all whom it may concern:*

Be it known that I, CHARLES B. COOPER, of Nashville, in the county of Davidson and State of Tennessee, have invented a new and useful Improvement in Water-Filters, of which the following is a specification:

The figure is a vertical section of my improved filter.

The object of this invention is to furnish an improved water-filter which shall be so constructed that it may be readily taken apart and cleaned without the assistance of a skillful workman, and that will enable the flow of water to be readily increased or decreased, as may be required.

The invention consists in the siphon provided with a perforated cone at the enlarged end of its short arm, and with a sponge and a perforated cone at the enlarged end of its long arm, in combination with the vessels of the filter; and in the concaved ring-plate, in combination with the vessels of the filter, and with the siphon and its attachments, as hereinafter fully described.

The body of the filter is made in two parts, A B, both of which are made with open tops, and the bottom of the upper part or vessel A fits into the mouth of the lower part or vessel B. To the bottom of the lower vessel B, and concentric therewith, is secured the bottom of an inner vessel, C, of about one-third the diameter of the said vessel B. D is a vessel fitting into the vessel C, and to the bottom of which is secured the base of a cone, E, of finely-perforated sheet metal. To the cone E is secured the lower end of an open-bottomed vessel F, of about half the diameter of the vessel D. The top of the vessel F rises above the top of the vessel D, but does not rise quite to the top of the vessel B. In a hole in the center of the bottom of the upper vessel A is secured the upper end of a hollow female screw, G, within which is placed a hollow cone, H, made of finely-perforated sheet metal, the edge of the base of which is secured to the lower end of the screw G. The screw G is made of sufficient length to enter the upper end of the vessel F. Into the female screw G fits a hollow male screw, I, which is screwed upon the enlarged end of the long arm of the siphon J. Within the cavity of the enlarged end of the siphon J is placed a sponge K, which rests upon the apex of the hollow perforated cone H, and which is pressed more or less closely upon the said cone by turning the screw I down or up in the screw G, to regulate the flow of the water. The end of the short arm of the siphon J is also enlarged, and has a hollow male screw, L, attached to it, which screws into the female screw M. To the lower end of the female screw M is attached the base of a cone, N, made of finely-perforated sheet metal, and which projects into the cavity of the enlarged end of the siphon J. The lower part of the space between the vessels F and D is filled with clean sand, and the upper part with fine gravel. The lower part of the space between the vessels C and B is filled with charcoal, and the upper part of said space is filled with coarse gravel. To the upper edge of the vessel D is attached the inner edge of the ring-plate O, which projects over the space between the vessels C and B. The ring-plate O is concaved, and has numerous holes formed in its middle part. The bottom of the vessel B, around the vessel C, is also perforated with numerous holes.

With this construction, as the water to be filtered is admitted into and rises in the vessel A, it flows through the siphon J, the perforated cone preventing the coarser impurities from entering the said siphon.

The water is further filtered as it flows from the siphon J through the sponge K and perforated cone H into the vessel F. From the vessel F the water passes through the perforated cone E into the space between the vessels F and D, rises through the sand and gravel in said space, and overflows into the concave ring O, through the holes in which it flows into the middle part of the space between the vessels C and B, percolates through the gravel and charcoal in said space, and flows out through the holes in the bottom of the vessel B into a receiver placed beneath it.

Having thus described my invention, I claim as new and desire to secure by Letters Patent—

1. The siphon J, provided with a perforated cone, N, at the enlarged end of its short arm, and a sponge and perforated cone, K H, at the enlarged end of its long arm, in combination with the vessels F D C B A, substantially as herein shown and described.

2. The concaved and perforated ring-plate O, in combination with the vessels D C B F A, and with the siphon J and its attachments, substantially as herein shown and described.

CHAS. B. COOPER.

Witnesses:
T. M. EUBANK,
J. M. BARNES.